United States Patent
Jadhav et al.

(10) Patent No.: US 11,132,226 B2
(45) Date of Patent: Sep. 28, 2021

(54) PARALLEL RESOURCE PROVISIONING

(71) Applicant: International Business Machines Corporation, Armonk, NY (US)

(72) Inventors: Sagar Jadhav, Pune (IN); Hugh Edward Hockett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/734,028

(22) Filed: Jan. 3, 2020

(65) Prior Publication Data

US 2021/0208934 A1 Jul. 8, 2021

(51) Int. Cl.
*G06F 9/50* (2006.01)
*G06F 8/60* (2018.01)

(52) U.S. Cl.
CPC .............. *G06F 9/5005* (2013.01); *G06F 8/60* (2013.01); *G06F 2209/505* (2013.01)

(58) Field of Classification Search
CPC .................................. G06F 9/5005; G06F 8/60
See application file for complete search history.

(56) References Cited

U.S. PATENT DOCUMENTS

| 9,262,127 | B2 | 2/2016 | Patrick | |
| 10,318,285 | B1 * | 6/2019 | Jodoin | G06F 8/60 |
| 10,318,347 | B1 * | 6/2019 | Wagner | G06F 9/4881 |

(Continued)

FOREIGN PATENT DOCUMENTS

| WO | 2019067747 A1 | 5/2019 |
| WO | 2019113216 A1 | 6/2019 |

OTHER PUBLICATIONS

Knecht, Sven Hans, "Treating Your Terraform like an Application: Part 2: How to Dockerize Terraform", medium.com—Capital One Tech, May 29, 2019, 7 pages, <https://medium.com/capital-one-tech/treating-your-terraform-like-an-application-how-to-dockerize-terraform-5d7edac741fc>.

(Continued)

*Primary Examiner* — Benjamin C Wu
(74) *Attorney, Agent, or Firm* — Christopher M. Pignato; Maeve Carpenter

(57) ABSTRACT

Computer-implemented methods, systems and computer program products that leverage infrastructure code (IaC) to provision applications in a computing environment as virtual resources. A plurality of containers operating parallel to one another process resource provisioning requests. A central application provisioner orchestrates the containerized provisioning of resources using IaC. Application provisioner introspects IaC templates defining the provisioning request and creates a graph of the templates, mapping requested resources to containers based on the specification of the containers available. Application provisioner spins up idle containers and distributes resource provisioning tasks amongst the idle containers. An idle container provisions an assigned resource and outputs individual state information describing the provisioned resource. Application provisioner aggregates the individual state information from the containers into a completed state file describing the provisioned application and deploys the provisioned application. Provisioned resources can be destroyed by deprovisioning the resource from the assigned container and outputting modified state information.

20 Claims, 8 Drawing Sheets

(56) References Cited

U.S. PATENT DOCUMENTS

| | | | |
|---|---|---|---|
| 10,601,683 B1* | 3/2020 | Kulshreshtha | G06F 9/5061 |
| 10,749,943 B1* | 8/2020 | Feiguine | H04L 67/1008 |
| 10,785,128 B1* | 9/2020 | Bawcom | G06F 8/38 |
| 10,791,021 B1* | 9/2020 | Sharma | H04L 41/0803 |
| 10,884,732 B1* | 1/2021 | Zolotow | G06F 8/76 |
| 2016/0291893 A1* | 10/2016 | Chan | G06F 8/60 |
| 2017/0026416 A1* | 1/2017 | Carpenter | H04L 41/0866 |
| 2017/0317881 A1* | 11/2017 | Smartt | G06F 12/00 |
| 2019/0028360 A1* | 1/2019 | Douglas | G06F 9/45512 |
| 2019/0171966 A1* | 6/2019 | Rangasamy | G06F 11/1464 |
| 2019/0294477 A1* | 9/2019 | Koppes | G06F 9/5072 |
| 2019/0342166 A1* | 11/2019 | Chaware | H04L 41/0813 |
| 2020/0004571 A1* | 1/2020 | Piwonka | G06F 8/30 |
| 2020/0278920 A1* | 9/2020 | Khakare | G06F 9/45558 |
| 2020/0326990 A1* | 10/2020 | Staffelbach | G06N 5/022 |
| 2020/0329464 A1* | 10/2020 | Madapoosi Sampath | G06F 9/5072 |
| 2020/0341876 A1* | 10/2020 | Gandhi | G06F 11/0709 |
| 2021/0036917 A1* | 2/2021 | Griffin | G06T 7/50 |
| 2021/0081245 A1* | 3/2021 | Lowther | G06F 9/5011 |
| 2021/0111949 A1* | 4/2021 | Collins | G06F 9/5088 |

OTHER PUBLICATIONS

Mell et al., "The NIST Definition of Cloud Computing", National Institute of Standards and Technology, Special Publication 800-145, Sep. 2011, 7 pages.

* cited by examiner

PARALLEL RESOURCE PROVISIONING

TECHNICAL FIELD

The present disclosure relates generally to the field of infrastructure as code and more specifically to parallel resource provisioning using infrastructure as code in containerized computing environments.

BACKGROUND

Infrastructure as code (IaC) is a process for managing or provisioning computing resources of computing systems through machine-readable definition files (referred to herein as "IaC templates" or "templates"), rather than through physical hardware configurations or by using interactive configuration tools to fulfill provisioning requests. The underlying infrastructure implemented or managed using IaC comprises physical equipment and hardware, such as bare-metal servers, virtual machines and the associated configured resources thereof. IaC can automate provisioning requests using either scripts or declarative definitions, as opposed to manually configurations and processes to provision resources.

Continuous configuration automation (CCA) tools can be considered an extension of traditional IaC frameworks. CCA tools can change, configure and automate infrastructure while providing visibility and flexibility in how the infrastructure is managed. Examples of CCA tools include Microsoft's DSC, Red Hat's Ansible, HashiCorp's Terraform, CFEngine, SaltStack, Chef and Puppet.

SUMMARY

Embodiments of the present disclosure relate to a computer-implemented method, an associated computer system and computer program product for implementing parallel provisioning of computing resources using containers assigned individually to the resources being provisioned. The computer-implemented method comprising: performing introspection of a template comprising infrastructure as code ("IaC"); preparing a graph describing the template based on the introspection of the template and mapping resources requested by the template to specifications of one of more containers configured to provision the resources mapped to the template; assigning provisioning tasks to a cluster of containers comprising at least two containers, wherein a first container receives a first provisioning task dedicated to provisioning a first resource and a second container receives a second provisioning task dedicated to provisioning a second resource; receiving a first output from the first container comprising a first state information describing deployment of the first resource provisioned by the first container; receiving a second output from the second container comprising a second state information describing deployment of the second resource provisioned by the second container; combining, state information from the cluster of containers, including the first state information outputted by the first container, and the second state information outputted by the second container, into a state file aggregating the state information from the at least two containers assigned the provisioning tasks into a complete state of a provisioned application; and deploying the provisioned application.

DETAILED DESCRIPTION

Figure 1:
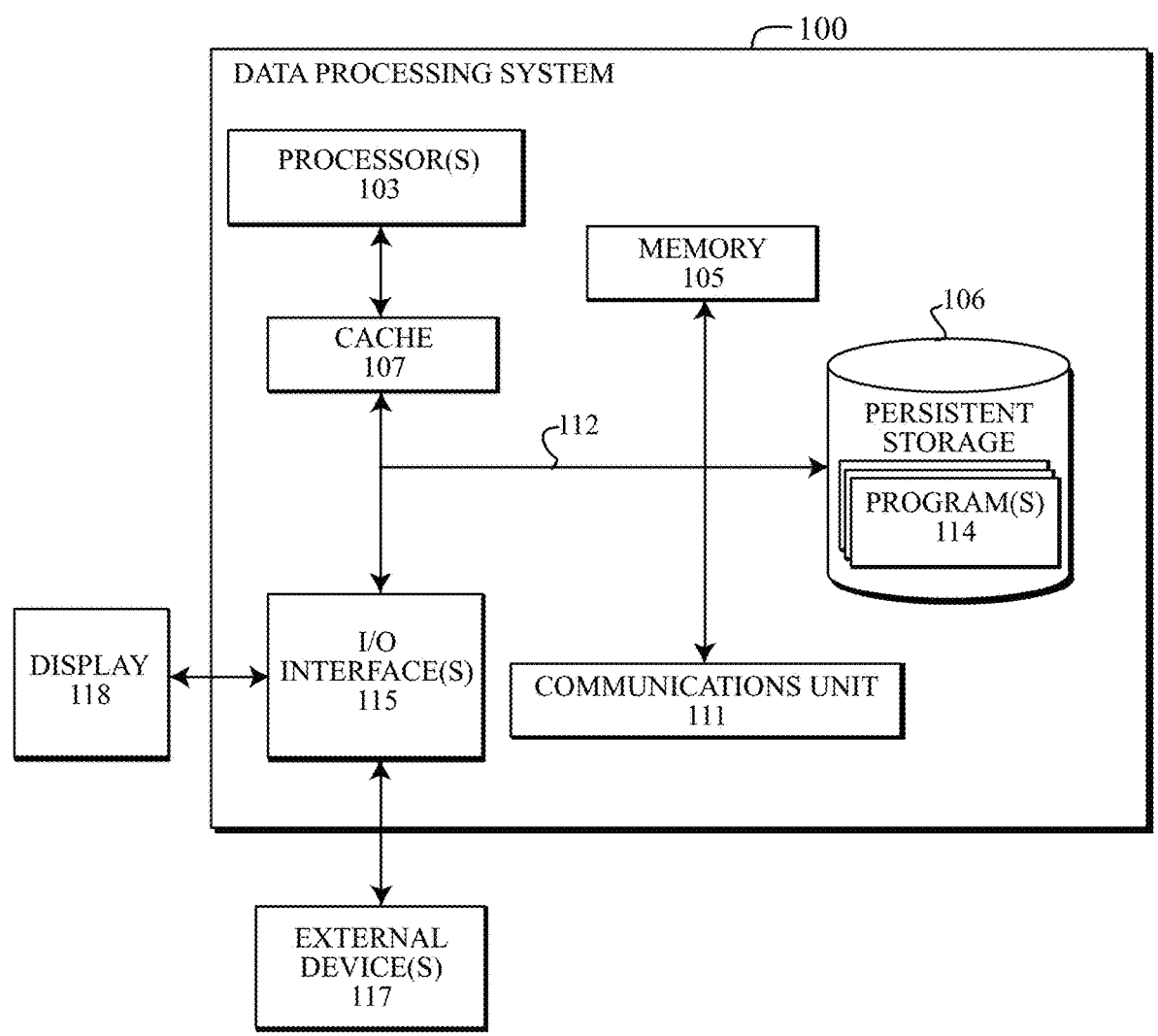
FIG. 1 depicts an embodiment of a block diagram of internal and external components of a data processing system, in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described in order to best explain the principles of the disclosure and the practical application and to enable others of ordinary skill in the art to understand the disclosure for various embodiments with various modifications as are suited to the particular use contemplated.

Overview

Traditional infrastructure management, such as using bare metal systems or virtual machines running inside a data center to provision resources to consumers of the infrastructure, is a slow, manual process that cannot keep up with the infrastructure demands of today's network-run applications and services. Under traditional management systems, consumers file tickets with the provider and a service provider at the other end of the request would manage the request by logging into a management portal or console, pointing and clicking on the requested piece of infrastructure and provisioning that infrastructure to the consumer. The manual approach may work sufficiently when the amount of infrastructure managed is relatively minimal or the life cycle of resources being provisioned are maintained for longer periods of time and thus infrastructure has a limited scale of deployment, but as large scale provisioning requests are made and/or the provisioning requests are directed toward short term resources, the ability for manual management of provisioning resources cannot keep up.

Embodiments of the present disclosure recognize that infrastructure management has transitioned to an environment where cloud environments are application program interface (API) driven, have much higher elasticity requirements for infrastructure because the life-cycle of resources being provisioned are much shorter than previously and instead of a handful of large instances being provisioned, many more smaller instances are being provisioned for individual resources. Moreover, embodiments of the present disclosure recognize that infrastructure management is trending toward cyclical patterns. For example, infrastructure is typically scaled-up to handle loads during peak hours of the day and scaled down at night to save on costs. Constantly performing manual scale up and down every day would be impractical for infrastructure managers that service large customer bases. Therefore, there is a need for automated infrastructure management that can easily scale up and down resource provisioning and deprovisioning, to meet the elastic infrastructure needs of service providers.

Embodiments of the present disclosure leverage the use of IaC, containerized provisioning tools and end-to-end orchestration to provision and deploy resources among parallel containers for user consumption and service providers, in a fast, automated manner that distributes the task across a cluster of containers. For instance, a single command to a resource provisioning tool can be used to run container clusters with all the necessary parameters to deploy or destroy resources requested by an IaC template. Embodiments of the present disclosure employ a centralized application provisioner to orchestrate resource provisioning and the deployment of the provisioned applications. Embodiments of the application provisioner receives input in the form of an IaC template requesting the provisioning of resources. The IaC template may be also be referred to as a definition file or configuration file. The IaC template describes one or more components that may be needed to run a single application or an entire data center 301. Embodiments of the IaC template can operate like a blueprint describing how to reach a desired state and then execute the infrastructure as code in accordance with the IaC template to build the described infrastructure by requesting a set of resources be provisioned to run the provisioned application.

The IaC template provides details describing the resources to provision and may include identifiers indicating that one or more resources may be dependent upon other resources being provisioned. Application provisioner can introspect the IaC template to identify the details of the resource provisioning request and prepare a resource graph containing information about the requested resources. Based on the graph of the resources, application provisioner can determine which idle containers in an available container cluster are available with the appropriate specifications for the resources requested to be provisioned. The application provisioner can spin up the selected containers and distribute provisioning tasks to the containers and manage resource assignments to the containers. In the exemplary embodiment, resource provisioning tasks can be split up and delegated to separate containers, wherein one container receives one resource to provision. Moreover, where one or more resources are dependent upon one another, a single container may be delegated tasks to provision the resource and any dependent resources.

Embodiments of the containers selected to provision resources being deployed, may execute provisioning tasks delegated to the container, and the containers may output information describing the state of the provisioned resource assigned to the container to the application provisioner. Application provisioner may receive the individual state information from all containers assigned to provision resources for the application being provisioned. The application provisioner may aggregate the individual states provided by the containers into a completed state file of the provisioned application and deploy the provisioned application. Changes to individual and overall state of the provisioned application may be useful for performing further operations over the provisioned application. For example, increasing or decreasing resources such as virtual storage, processing power, memory, etc.

In some alternative embodiments, where the application provisioner is part of a cloud native platform, instead of performing parallel provisioning of resources using containers, the containers can be replaced with server-less functions, wherein the provisioned application can be composed into individual, autonomous functions and each function hosted by the cloud service provider and managed by the application provisioner, can be scaled automatically to individual server-less functions, as function call frequency of the provisioned application increases or decreases.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 100, which may be a simplified example of a computing system capable of performing the computing operations described herein. Data processing system 100 may be representative of the one or more computing systems or devices depicted in the computing environment 200, 300, 400, 500, 550 as shown in FIGS. 2-5b, and in accordance with the embodiments of the present disclosure described herein. It should be appreciated that FIG. 1 provides only an illustration of one implementation of a data processing system 100 and does not imply any limitations with regard to the environments in which different embodiments may be implemented. In general, the components illustrated in FIG. 1 may be representative of any electronic device capable of executing machine-readable program instructions.

While FIG. 1 shows one example of a data processing system 100, a data processing system 100 may take many different forms, both real and virtualized. For example, data processing system 100 can take the form of personal desktop computer systems, laptops, notebooks, tablets, servers, client systems, network devices, network terminals, thin clients, thick clients, kiosks, mobile communication devices (e.g., smartphones), augmented reality devices, multiprocessor systems, microprocessor-based systems, minicomputer systems, mainframe computer systems, smart devices, or Internet-of-Things (IoT) devices, etc. The data processing systems 100 can operate in a networked computing environment, containerized environment, a distributed cloud computing environment and/or a serverless computing environment, which can include any of the systems or devices described herein and/or additional computing devices or systems known or used by a person of ordinary skill in the art.

Data processing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, communications, and network processors, etc.), memory 105, external devices 117, and any other hardware components within a data processing system 100. For example, communications fabric 112 can be implemented as one or more buses.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Software program(s) 114, applications, and services described herein, may be stored in memory 105 and/or persistent storage 106 for execution and/or access by one or more of the respective processor(s) 103 of the computer system 100.

Persistent storage 106 may include a plurality of magnetic hard disk drives. Alternatively, or in addition to magnetic hard disk drives, persistent storage 106 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between data processing systems 100. For example, between one or more computer systems or devices via a communication network. In the exemplary embodiment, communications unit 111 may include network adapters or interfaces such as a TCP/IP adapter cards, wireless Wi-Fi interface cards, 3G, 4G, or 5G cellular network interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks devices, systems, hosts, terminals or other network computer systems. Software and data used to practice embodiments of the present invention can be downloaded to the computer systems operating in a network environment through communications unit 111 (e.g., via the Internet, a local area network or other wide area networks). From communications unit 111, the software and the data of program(s) 114, applications or services can be loaded into persistent storage 106.

One or more I/O interfaces 115 may allow for input and output of data with other devices that may be connected to data processing system 100. For example, I/O interface 115 can provide a connection to one or more external devices 117 such as one or more smart devices, IoT devices, recording devices such as an audio system, camera systems, one or more sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, a computer monitor or screen. Human-readable display 118 can also be an incorporated display and may function as a touch screen, such as a built-in display of a tablet computer.

System for Performing Parallel Provisioning of Resources Using Infrastructure as Code Referring to the drawings, FIGS. 2-5b depict an approach that can be executed using one or more data processing systems 100 operating within a computing environment 200, 300, 400, 500, 550 and variations thereof, to implement systems, methods and computer program products for performing parallel provisioning of resources to deploy or one or more provisioned applications 225, programs 114 or services hosted by a host system 201, data center 301 or network 250 using containerized environments dedicated to provisioning said resources. Embodiments of computing environments 200, 300, 400, 500, 550 may include one or more data processing systems 100 interconnected via a device network 250. The data processing systems 100 connected to the device network 250 may be specialized systems or devices that may include, but are not limited to, the interconnection of one or more host system 201, a data center 301 maintaining a plurality of host systems 201a-201n (both real and virtual) and/or one or more client system 227a-227n (referred to generally as client system 227). The data processing systems 100 exemplified in FIGS. 2-5b may not only comprise the elements of the systems and devices depicted in the drawings of FIGS. 2-5b, but the specialized data processing systems depicted may further incorporate one or more elements of a data processing system 100 shown in FIG. 1 and described above. Although not shown in the figures, one or more elements of the data processing system 100 may be integrated into the embodiments of host system 201, data center 301 and/or client system 227, including (but not limited to) the integration of one or more processor(s) 103, program(s) 114, memory 105, persistent storage 106, cache 107, communications unit 111, input/output (I/O) interface(s) 115, external device(s) 117 and human-readable display 118.

Embodiments of the host system 201, data center 301 and/or client system 227 may be placed into communication with one another via computer network 250. Embodiments of network 250 may be constructed using wired, wireless or fiber-optic connections. Embodiments of the host system 201, data center 301 and/or client system 227 may connect and communicate over the network 250 via a communications unit 111, such as a network interface controller, network interface card or other network communication device capable of facilitating a connection with network 250. In some embodiments of computing environments 200, 300, 400, 500, 550, one or more host system 201, client system 227 or other data processing systems 100 may represent data processing systems 100 utilizing clustered computers and components acting as a single pool of seamless resources when accessed through network 250. For example, such embodiments can be used in a data center 301, cloud computing, storage area network (SAN), and network-attached storage (NAS) applications.

Embodiments of the communications unit 111 may implement specialized electronic circuitry, allowing for communication using a specific physical layer and a data link layer standard. For example, Ethernet, Fiber channel, Wi-Fi or Token Ring to transmit data between the host system(s) 201, data center 301 and/or client systems 227 connected to network 250. Communications unit 111 may further allow for a full network protocol stack, enabling communication over network 250 to groups of host systems 201 and/or client systems 227 and other data processing systems 100 linked together through communication channels of network 250. Network 250 may facilitate communication and resource sharing among host systems 201, client systems 227 and other data processing systems 100 (for example, network-accessible storage media) connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center 301).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 400 is service-oriented with a focus on statelessness, low coupling, modularity, and semantic interoperability. At the heart of cloud computing is an infrastructure that includes a network 250 of interconnected nodes 410.

Figure 4A:
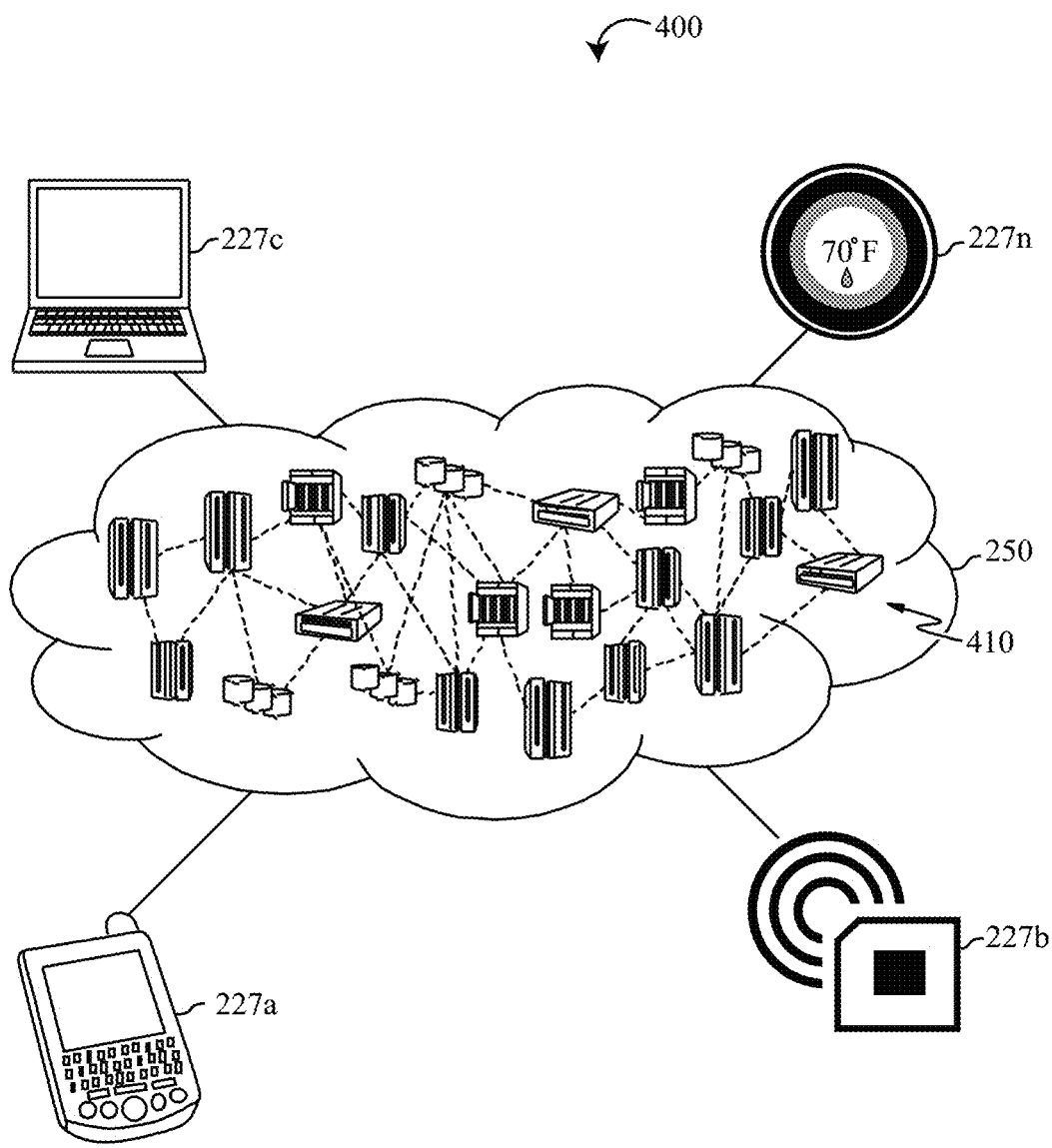
FIG. 4a depicts an embodiment of a cloud computing environment within which embodiments described herein may be implemented in accordance with the present disclosure.

Referring to the drawings, FIG. 4*a* is an illustrative example of a cloud computing environment 400. As shown, cloud computing environment 400 includes one or more cloud computing nodes 410 with which client systems 227 operates as a client controlled by the cloud consumers. Client system 227 may communicate with the cloud computing environment 400, for example via client systems 227*a*, 227*b*, 227*c*, 227*n* as illustrated in FIG. 4*a*. Nodes 410 of the cloud computing environment 400 may communicate with one another and may be grouped (not shown) physically or virtually, in one or more networks, such as Private, Community, Public, or Hybrid clouds as described hereinabove, or a combination thereof. This may allow the cloud computing environment 400 to offer infrastructure, platforms and/or software as services for which a cloud consumer does not need to maintain resources on a client system 227. It is understood that the types of client systems 227 connected to the cloud computing environment 400, are intended to be illustrative only and that computing nodes 410 of the cloud computing environment 400 can communicate with any type of computerized device over any type of network and/or network addressable connection (e.g., using a web browser).

Figure 4B:
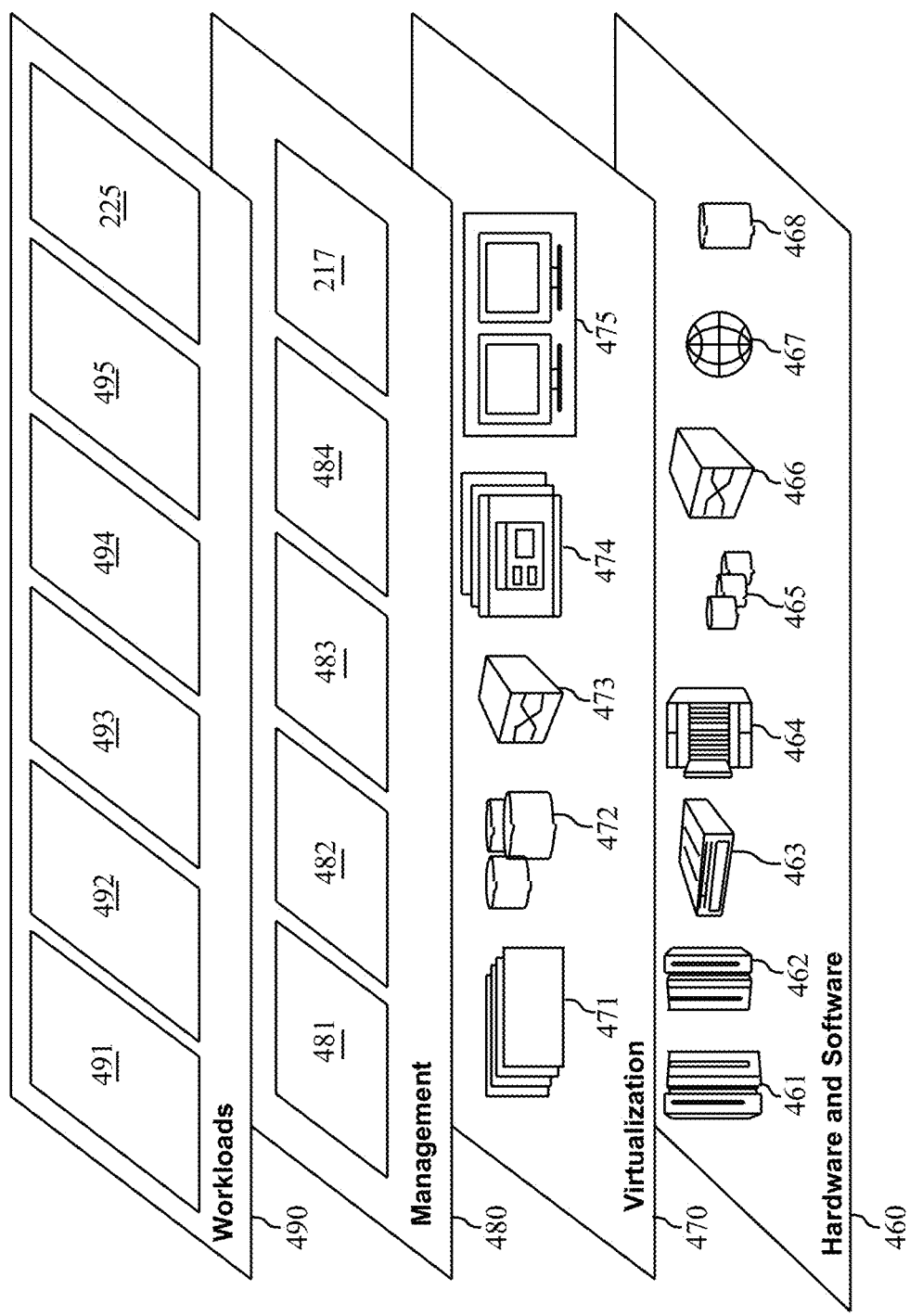
FIG. 4b depicts an embodiment of abstraction model layers of a cloud computing environment in accordance with the present disclosure.

Referring now to FIG. 4*b*, a set of functional abstraction layers provided by cloud computing environment 400 is shown. It should be understood in advance that the components, layers, and functions shown in FIG. 4*b* are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. application provisioner 217 provides dynamic procurement of computing resources and other resources that are utilized to perform tasks within the cloud computing environment 400. Metering and pricing 482 provide cost tracking as resources are utilized within the cloud computing environment 400, and billing or invoicing for consumption of these resources. In one example, these resources can include application software licenses. Security provides identity verification for cloud consumers and tasks, as well as protection for data and other resources. User portal 483 provides access to the cloud computing environment 400 for consumers and system administrators. Service level management 484 provides cloud computing resource allocation and management such that required service levels are met. Service Level Agreement (SLA) planning and fulfillment 481 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, data analytics processing 493, virtual classroom education delivery 494, transaction processing 495, and other provisioned applications 225 or network services 323 offered by cloud computing environment 400.

Figure 2:
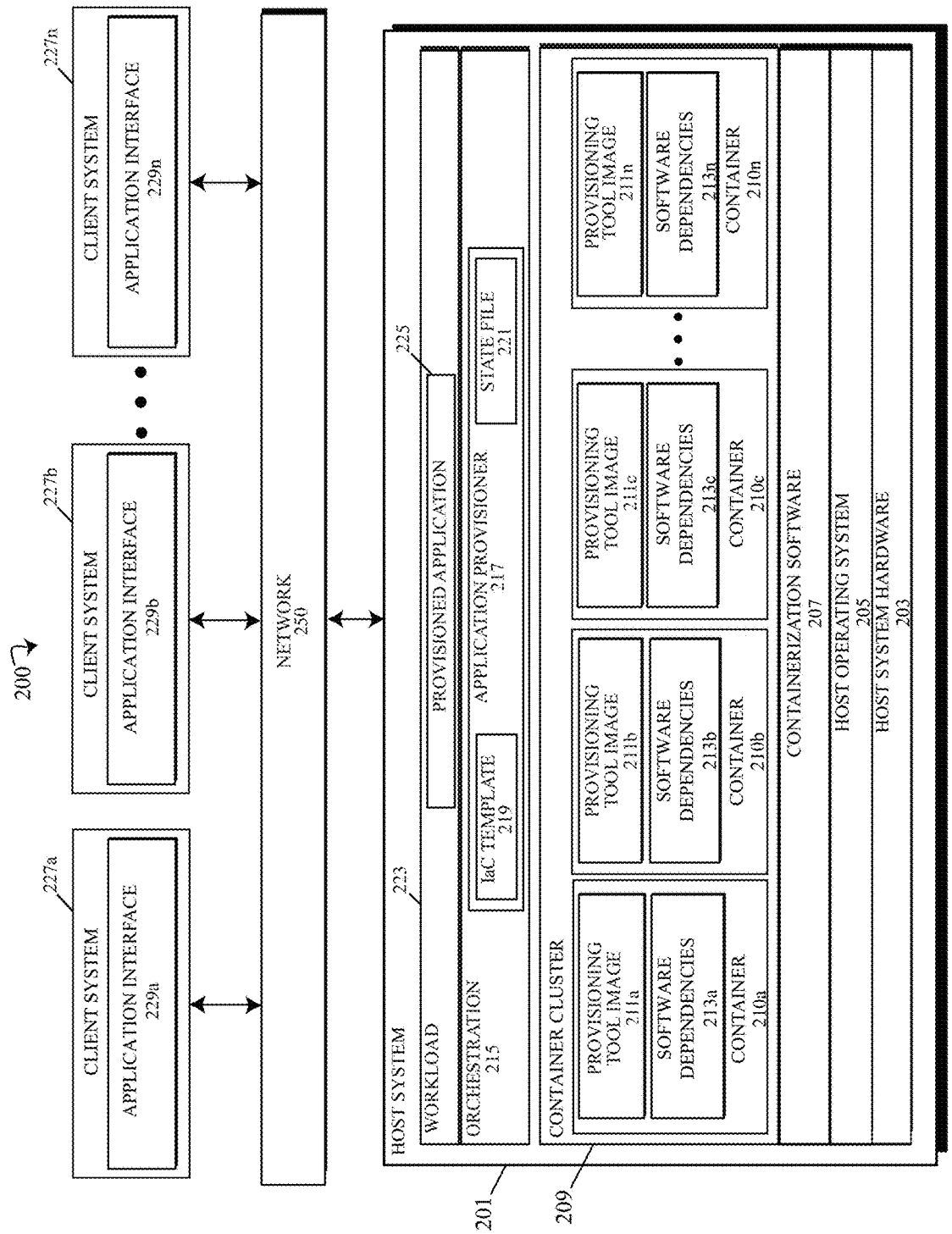
FIG. 2 depicts a block diagram of an embodiment of a computing environment for implementing parallel provisioning of an application with resources using a plurality of containerized provisioning tools to provision resources in accordance with the present disclosure.

Referring back to the drawings, FIG. 2 depicts an embodiment of a computing environment 200 capable of executing IaC to perform parallel provisioning (or deprovisioning) of resources to support deployed instances of a provisioned application 225, program 114, service or other software being made accessible by a service provider to one or more client systems 227 via a network 250. The provisioned application(s) 225, programs 114, services, etc. may be deployed within instances created by a host system 201. Host system 201 may create the infrastructure for hosting the instances of the provisioned application 225 (and the application's dependencies) by performing parallel provisioning of resources using IaC and containerized provisioning tools 211*a*, 211*b*, 211*c* . . . 211*n* (referred to generally as provisioning tools 211) maintained within a container 210*a*, 210*b*, 210*c* . . . 210*n* (referred to generally as container 210) environment to create, manage and delete infrastructure in accordance with instructions provided by an IaC template 219. Each container 210 may perform one or more provisioning tasks assigned and/or orchestrated by an application provisioner 217, in accordance with the IaC template 219. Embodiments of containers 210 can be pre-installed with provisioning tools 211, including scripts that can automatically pull IaC templates 219 and execute provisioning functions assigned by the application provisioner 217. In some embodiments, a single command using a CLI or REST API can run the container(s) 210 with all of the parameters necessary to deploy a provisioned application 225 in accordance with an IaC template 219 or deprovision an existing instance of a provisioned application 225.

Embodiments of the containers 210 may be part of a container cluster 209 comprising a plurality of containers 210 being managed by the application provisioner 217. Application provisioner 217 may control container configurations, specifications (e.g. CPU, RAM, I/O, storage, etc.), container creation, deletion and assign resource provisioning (or deprovisioning) tasks for deploying a provisioned application 225. Application provisioner 217 can react to changing conditions within the container cluster 209 and reschedule assigned tasks in response to provisioning failures, and the growing or shrinking of the container cluster 209. FIG. 2 depict a block diagram representation of a container cluster 209 of a host system 201 comprising a plurality of containers 210 managed by application provisioner 217. While only a single container cluster 209 is depicted in FIG. 2, the containers 210 created by host system 201 may be organized into two or more clusters 209 and managed by application provisioner 217 to deploy one or more provisioned applications 225 to a workload 223 layer of the host system 201.

Embodiments of the containers 210 may comprise an image of a provisioning tool 211, and the software dependencies 213*a*-213*n* of the provisioning tool image 211, maintained within the container's 210 operating environment to process provisioning or deprovisioning tasks assigned to the container 210 by application provisioner 217. The host system 201 may run a multi-user operating system (i.e. the host operating system 205) and provide computing resources of the host system hardware 203 to the one or more containers 210 executing the provisioning tool 211 to complete a resource provisioning or deprovisioning tasks at the direction of application provisioner 217. In some embodiments, the application provisioner 217 may be integrated into one or more functions of the host operating system 205. In other embodiments, the application provisioner 217 may be an independent program or service running as part of an orchestration 215 layer of the host system 201 and/or the orchestration 215 layer of the network 250 coordinating end-to-end provisioning of the provisioned application 225.

Figure 3:
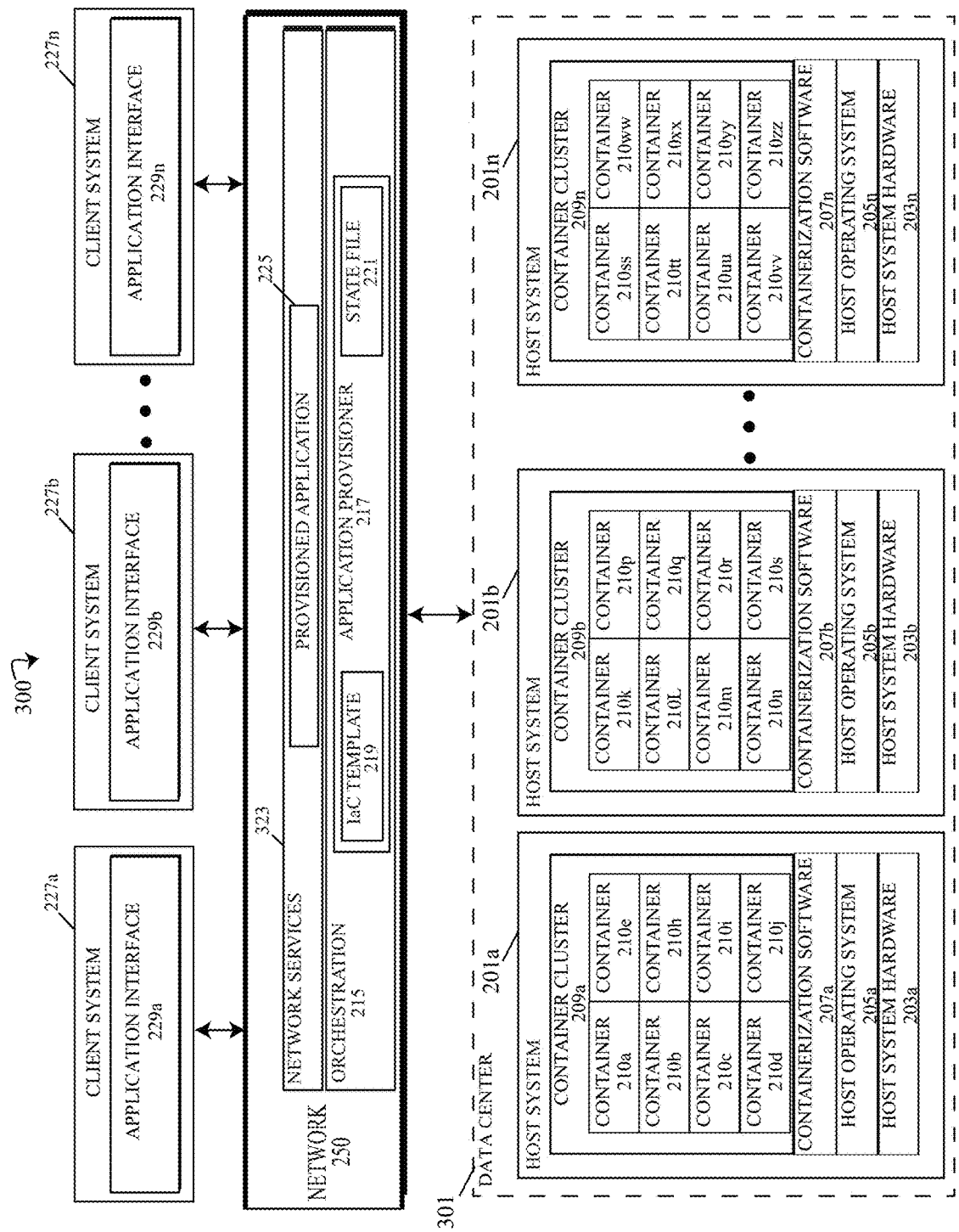
FIG. 3 depicts a block diagram of an alternative embodiment of a computing environment for implementing parallel provisioning of an application with resources using a plurality of containerized provisioning tools to provision resources in accordance with the present disclosure.

Embodiments of host system 201 may be organized into one or more data centers 301 which may span multiple networks, domains, and/or geolocations and comprise a plurality of host systems 201a, 201b, 201n, each comprising a plurality of container clusters 209a, 209b, 209c that comprise a plurality of containers 210a-210j, 210k-210s and 210ss-210zz, as shown in the example of FIG. 3. The data centers 301 may reside at physical locations in some embodiments, while in other embodiments, the data centers 301 may comprise a plurality of host systems 201 distributed across a cloud network and/or a combination of physically localized and distributed host systems 201. Data centers 301 may include one or more host system 201 (real or virtual) providing host system hardware 203, a host operating system 205 and/or containerization software 207 such as, but not limited to, the open-source Docker and/or OpenShift software, to execute and run the containerized application images of the provisioning tools 211 encapsulated within the environment of the containers 210.

Although the exemplary embodiment depicted in FIG. 2 of a host system 201 includes four containers 270 within a container cluster 209, the embodiment of FIG. 2-3 is merely illustrative of the concept that a plurality of containers 210 can be hosted and managed by a host system 201 and/or that a data center 301 may host and manage a plurality of host systems 201 each comprising one or more container clusters 209 that may include a plurality of containers 210. The embodiment of FIG. 2-3 should in no way be considered to imply that the host systems 201 is limited to hosting only four containers 210 or that a data center is any way limited to maintaining three host systems 201. The number of containers 210 and the size of container clusters 209 hosted and managed by a host system 201 and/or the number of host systems 201 managed by a data center 301 may vary depending on the amount of computing resources available, based on the host system hardware 203, data center 301 hardware and the amount of computing resources required by the provisioning tools 211 being executed within the containers 210 by the containerization software 207.

Embodiments of the containerization software 207 may operate as a software platform for developing, delivering, and running containerized programs and applications, as well as allowing for the deployment of code quickly within the computing environment of the containers 210. For example, provisioning tools 211 such as Microsoft's DSC, Red Hat's Ansible, HashiCorp's Terraform, CFEngine, SaltStack, Chef and Puppet can be executed within the container 210 environment and perform resource provisioning tasks assigned to the container 210. Embodiments of containers 210 can be transferred between host systems 201 as well as between different data centers 301 that may be operating in different geolocations, allowing for the containers 210 to run on any host system 201 running containerization software 207. The containerization software 207 may enable the host system 201 to separate the containerized applications and programs from the host system hardware 203 and other infrastructure of the host system 201, allowing the host system 201 to provision individual resources using individual containers 210 contributing the resources to the provisioned application 225 in accordance with the application provisioner's 217 assigned provisioning tasks to the individual containers 210.

The containerization software 207 provides host system 201 with the ability to package and run application images such as provisioning tools 211 within the isolated environment of the container 210. Isolation and security provided by individual containers 210 may allow the host system 201 to run multiple instances of the provisioning tool 211 simultaneously on a single host system 201. A container 210 may be lightweight due to the elimination of any need for a hypervisor, typically used by virtual machines. Rather, the containers 210 can run directly within the kernel of the host operating system 205. However, embodiments of the provisioning tool images 211 may benefit from combining virtualization of virtual machines with containerization. For example, the host system 201 may be a virtual machine running containerization software 207.

Embodiments of the containerization software 207 may comprise a containerization engine (not shown). The containerization engine may be a client-server application which may comprise a server program running a daemon process, a REST API specifying one or more interfaces that the applications and/or other programs may use to talk to the daemon process and provide instructions to the provisioning tool image 211, as well as a command-line interface (CLI) client for inputting instructions. In one embodiment, the client system 227 may input commands using a CLI to communicate with the containerization software 207 of the host system 201. In the exemplary embodiment depicted in FIG. 2-3, commands provided by the client system 227 to the host system 201 may be input via the application interface 229 loaded into the memory 105 or persistent storage 106 of the client system 227 interfacing with the host system 201 or data center 301.

Embodiments of the CLI may use a REST API of the containerization engine to control or interact with the daemon through automated scripting or via direct CLI commands. In response to the instructions received from the CLI, via the REST API, the daemon may create and manage the containerization software 207, including provisioning tools 211 residing within the containers 210, the containers 210 themselves, networks, data volumes, plugins, etc. An image may be a read-only template with instructions for creating a container 210 and may be customizable. Containers 210 may be a runnable instance of the software image. Containers 210 can be created, started, stopped, moved or deleted using a containerization software 207 API or via the CLI. Containers 210 can be connected to one or more networks 250, can be attached to a storage device and/or create a new image based on the current state of a container 210.

Embodiments of the application provisioner 217 can orchestrate and manage resource provisioning and deprovisioning of infrastructure dedicated to supporting instances of a provisioned applications 225 in response to commands or scripts executed by a service provider seeking to deploy a provisioned application 225 for use by one or more end users. Service providers may submit requests to scale up or scale down infrastructure being dedicated to a provisioned application 225 using scripts or other commands inputted into the application interface 229. In some embodiments scripts or commands entered into the application interface 229 instruct an application provisioner 217 to pull an IaC template 219 from a particular repository and input the IaC template 219 into the application provisioner 217. Embodiments of the CLI can include a parameter instructing the application provisioner to provision or deprovision, and the location of the IaC template 219 being used to guide the provisioning or deprovisioning infrastructure of the provisioned application 225. For example, a service provider can input a command such as "run application provisioner provision <GITHUB_URL>" to provision an application in accordance with the IaC template 219 pulled from the GitHub URL specified by the command. Conversely, a command such as "run application provisioner deprovision <GITHUB_URL>" may deprovision the resources of a provisioned application 225. In alternative embodiments, containers can be run in the background using a command such as "run-d application provisioner" and then execute a shell script inside the container 210 to provision or deprovision an application in accordance with a defined IaC template 219 pulled from a repository location. For example, executing a shell script such as "provisioner provision <GITHUB_URL>".

As noted above, instead of using a CLI to execute commands and automated scripts, similar commands can be provided instructing the application provisioner 217 to provision infrastructure of the host system 201 to run an instance of an application using REST API. For example, using the following REST API command to perform a provision request using an IaC template 219 stored by the identified repository:
Method: POST
{
operations: provision,
git_repo:<GIT_REPO>
}

Embodiments of the application provisioner 217 receiving the IaC templates 219 can manage resource provisioning tasks performed by the provisioning tools 211 of the containers 210 and/or container clusters 209 to create, modify, delete and provide versioning of infrastructure requests submitted by service providers. Embodiments of the IaC template 219 being inputted into the application provisioner 217 can provide automated configuration information for setting up the provisioned application 225. Embodiments of the application provisioner 217 may use IaC templates 219 as a blueprint for creating, modifying and removing resources provisioned to the provisioned application 225. Embodiments of the IaC template 219 may describe each of the resources and resource dependencies that may be required by a provisioned application 225 to meet the specified state requirements defined by the IaC template 219. For example, a service provider accessing host system 201 or data center 301 can increase or decrease the amount of infrastructure dedicated to supporting instances of a provisioned application 225 by executing an automated script, REST API or command pulling an IaC template 219 into the application provisioner 217 that describes the resource requirements based on expected use of the provisioned application 225. For instance, inputting a command or executing a script for an IaC template 219 that increases amounts of infrastructure being allocated to the instances of the provisioned application 225 ahead of peak usage times by end users and/or decreasing an amount of infrastructure dedicated to the provisioned application 225 prior to expected decreases in the use of the provisioned application 225 by end users. For example, to reduce costs overnight during off-peak usage hours.

Embodiments of the application provisioner 217 can perform one or more functions or tasks to achieve the state defined by the IaC template 219. For example, embodiments of the application provisioner 217 can perform functions or tasks associated with introspection of the IaC template 219, generating a resource graph describing the resources that may be required for providing the infrastructure requested by the IaC template 219, including any resource dependencies of the infrastructure, determining from the idle containers 210 of one or more container clusters 209, which containers 210 may meet the specifications for provisioning resources to the provisioned application 225, distributing resource provisioning tasks to one or more containers 210, spinning up new containers with allocated resources to complete infrastructure requests of the IaC template 219, aggregating state information from each container 210 assigned a provisioning task and outputting an aggregated state file 221 combining the state information from all of the containers 210 assigned a provisioning task into a completed state file 221 describing the completed state information of the provisioned application.

During introspection of the IaC template 219, embodiments of the application provisioner 217 may read the IaC template 219 and determine the number of containers 210 to spin up from a container cluster 209 to fulfill the requirements of the IaC template 219. Embodiments of the application provisioner 217 may scan available and/or un-used containers 210 during introspection to determine the specifications of the individual containers 210, including (but not limited to) specifications such as CPU, allocated amounts of memory, storage size, etc. Based on the determined specifications of the containers 210, the application provisioner may determine the kinds of resources that can be provisioned by each of the individual containers 210 that may be idle and/or available within a container cluster 209 for completing a resource provisioning task of the IaC template 219. In some embodiments, the application provisioner 217 may be able to adjust the amount of resources of the host system hardware 203 that may be dedicated to the containers 210 by the host operating system 205. By adjusting the specifications of the containers 210 via the host operating system 205, the application provisioner 217 can tune up containers 210 with higher specifications as needed to fulfill individual resource provisioning tasks defined by the IaC template 219.

Embodiments of the application provisioner 217 may use one or more different methods to determine the type or level of specifications a container 210 may require or be considered ideal for performing a particular provisioning task described by the IaC template 219. For example, in some embodiments, a container 210 specifications for performing provisioning tasks may be identified using community derived specifications or crowdsourced specifications from one or more application provisioners 217 that may have previously performed similar provisioning tasks and the level of specifications of the container used to complete the task. Using a community-driven method for determining specifications may provide an accurate level of precision when more data points are available (i.e. the more similar provisioning tasks are completed, and the specifications to achieve said completion are reported and shared). In other embodiments, the appropriate specifications of a container 210 for completing a provisioning task may be manually inputted by seeding a host system 201 or data center 301 with initial mappings of resources to container 210 specifications. In some embodiments, machine learning algorithms may be further applied to analyze existing data points describing historically completed resource provisioning or deprovisioning tasks performed by containers 210, the specifications of the containers 210 and the success rate of the containers 210 performing the task and based on the success or failure of the containers 210 described by the results of the historical data, determine an optimal container specification 210 for completing the provisioning or deprovisioning task analyzed by the machine learning algorithm.

During introspection of the IaC template 219, embodiments of the application provisioner 217 may prepare a resource graph after analyzing the IaC template 219. The IaC template 219 may describe the resources requested for completing the request to provide infrastructure to the provisioned application 225, including one or more resource dependencies. The resource graph prepared by the application provisioner 217 may describe resources that can be provisioned parallel to one another using separate containers 210 and resources which are dependent upon one another. Using the resource graph, the application provisioner 217 can determine the idle containers 210 in a container cluster 209 that are available to receive provisioning tasks. If a lack of containers 210 are available, or there are insufficient containers 210 with the specifications needed to complete the resource provisioning tasks, the host operating system 205 and containerization software 207 may spin up additional containers 210 comprising the requisite specifications to complete the provisioning tasks described by the resource graph or tune up existing containers 210 with specifications to complete the provisioning task assigned. For example, if a provisioning request requires additional processing power beyond the capabilities of existing containers 210, the application provisioner 217 can spin up a new container 210 with enough CPU processing power anticipated to complete the provisioned task. Alternatively, an existing container 210 could be tuned up and allocated additional CPU processing power to complete the provisioned task being assigned by the application provisioner 217.

Furthermore, embodiments of the application provisioner 217 can use the resource graph to assign resource provisioning tasks to the containers 210. For resources that are independent from one another, each resource being provisioned can be assigned to a single dedicated container 210. Conversely, where resources are dependent upon other resources, the parent resource and dependent resources can all be provisioned by the same container 210, preventing a scenario where if a parent and dependent resource are provisioned by separate containers 210, there is a possibility that the container 210 assigned to provision the dependent resource could complete the task before the container 210 assigned to provision the parent resource, resulting in an error. However, by assigning a single container 210 to provision the parent resource and the dependent resource, the parent will be provisioned first, followed by the dependent resource, eliminating the possibility of dependent resources being provisioned out of order and resulting in the error.

Figure 5A:
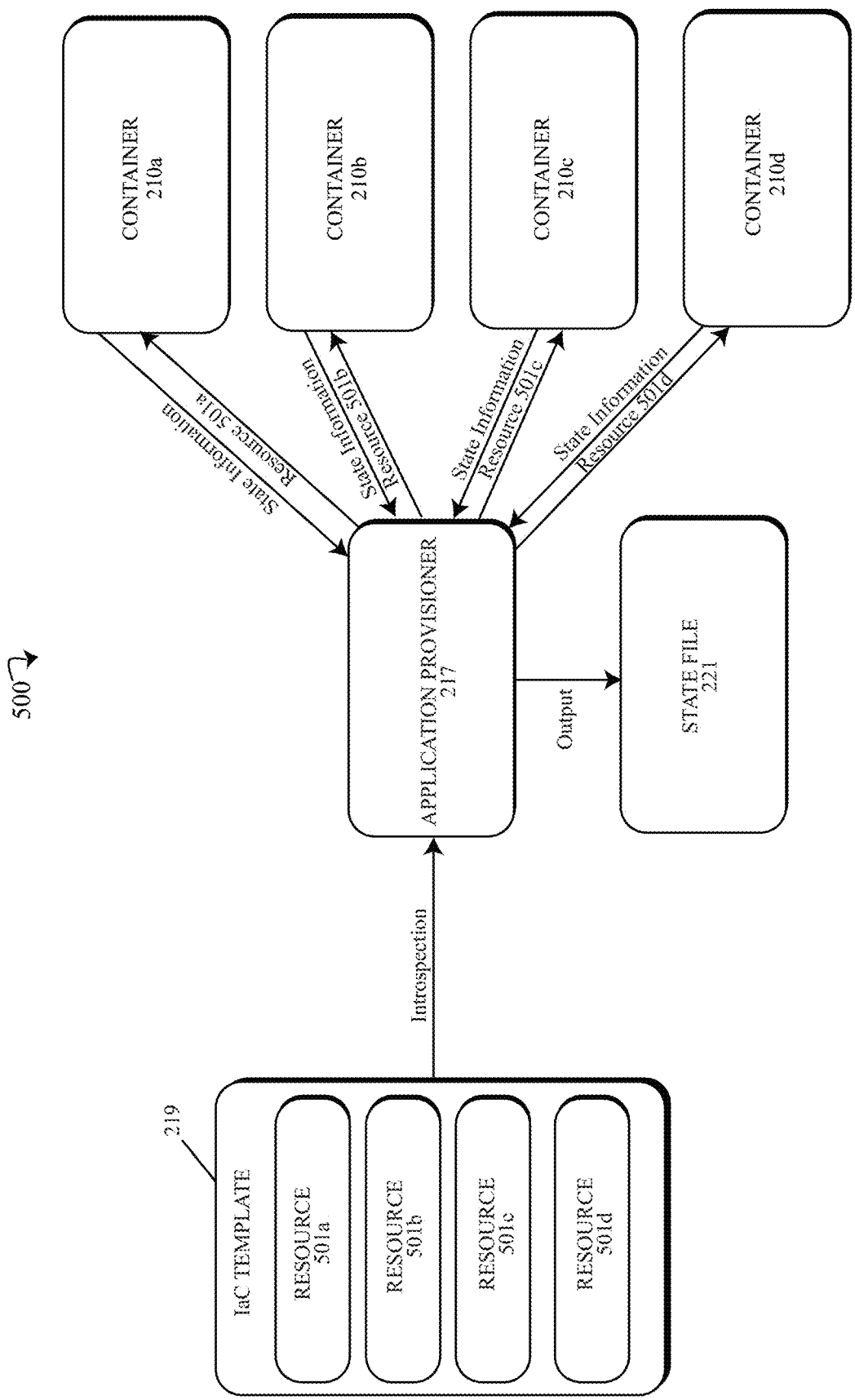
FIG. 5a illustrates a flow diagram depicting an embodiment of an application provisioner provisioning resources using containerized parallel provisioning in accordance with the present disclosure.
Figure 5B:
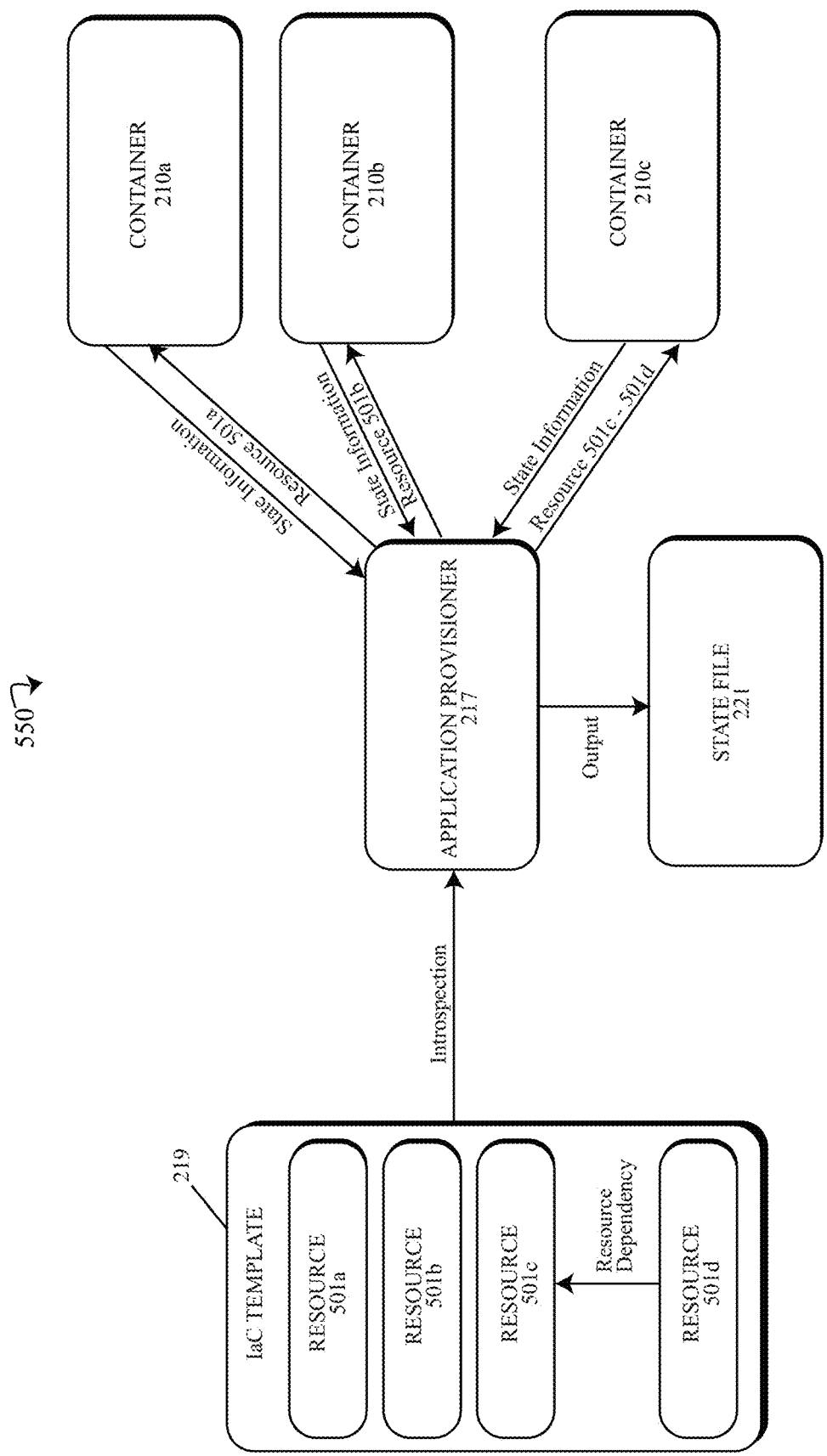
FIG. 5b illustrates a flow diagram depicting an alternative embodiment of an application provisioner provisioning resources using containerized parallel provisioning in accordance with the present disclosure.

FIG. 5a and FIG. 5b depict flow charts describing the assignment of resource provisioning tasks to a plurality of containers 210a-210d based on the dependencies (or lack thereof) of resources 501a-501d. For example, in FIG. 5a, the application provisioner 217 introspects the IaC template 219 describing the provisioning of infrastructure that includes provisioning of resources 501a-501d in parallel, wherein resources 501a, 501b, 501c and 501d are independent of one another. Accordingly, application provisioner 217 assigns a task to provision resource 501a to container 210a; a task to provision resource 501b to container 210b; a task to provision resource 501c to container 210 and a task to provision resource 501d to container 210d. Accordingly, each container 210a-210d outputs state information describing the state of the resource 501a-501d being provisioned. The outputted state information describing the state of the resource 501a-501d is reported back to the application provisioner 217 and the application provisioner 217 can aggregate each set of state information from the individual containers 210a-d into the state file 221 describing the state of the provisioned application 225 in accordance with the state prescribed by the IaC template 219.

In contrast to the provisioning scenario described by FIG. 5a, in FIG. 5b, resource 501d is dependent upon resource 501c. Instead of assigning provisioning tasks to separate containers 210c and 210d as shown in FIG. 5a, in order to provision dependent resources 501c and 501d, application provisioner 217 may assign provisioning tasks for resource 501c and 501d to the same container 210c as shown and described in FIG. 5b. Accordingly, container 210c can provision resource 501c first, followed by the dependent resource 501c, and output state information of both resources 501c, 501d back to the application provisioner 217. Similar to the example of FIG. 5a, in FIG. 5b, the application provisioner 217 aggregates the state information collected from containers 210a-210c comprising the state of resources 501a-501d and outputs a state file 221 describing the provisioned resources 501a-501d.

The state file 221 stores state information about the managed infrastructure and configuration of the provisioned application 225 instances. Embodiments of the state file 221 may map physical resources of the host system hardware 203 to the configuration of the provisioned application 225 to know which instances of a provisioned application 225 are represented by the provisioned resources. Moreover, in some embodiments, state file 221 may further track metadata such as resource dependencies and the dependency order within the state file 221. By tracking the dependency order within the state file 221, application provisioner 217 understands how to delete a resource and the order for deleting dependent resources. For example, when instructed to deprovision a provisioned application 225 or when the configuration of the provisioned application 225 changes and the previously provisioned resource is no longer part of the configuration, the application provisioner 217 can recognize the existence of an erroneous resource mapping and delete the mapped resource described by the state file 221.

In addition to basic mapping of resources to the provisioned application 225, the state file 221 may also store a cache of attribute values for all resources in the current state of the provisioned application 225. Application provisioner 217 may use the current state of the resources to determine when changes are needed to reach a newly desired configuration. For example, in response to receiving a command to provision additional infrastructure, application provisioner 217 can identify changes necessary to achieve the state of a new configuration described by the IaC template 219 and provision additional resources or adjust resource values as needed.

Figure 6:
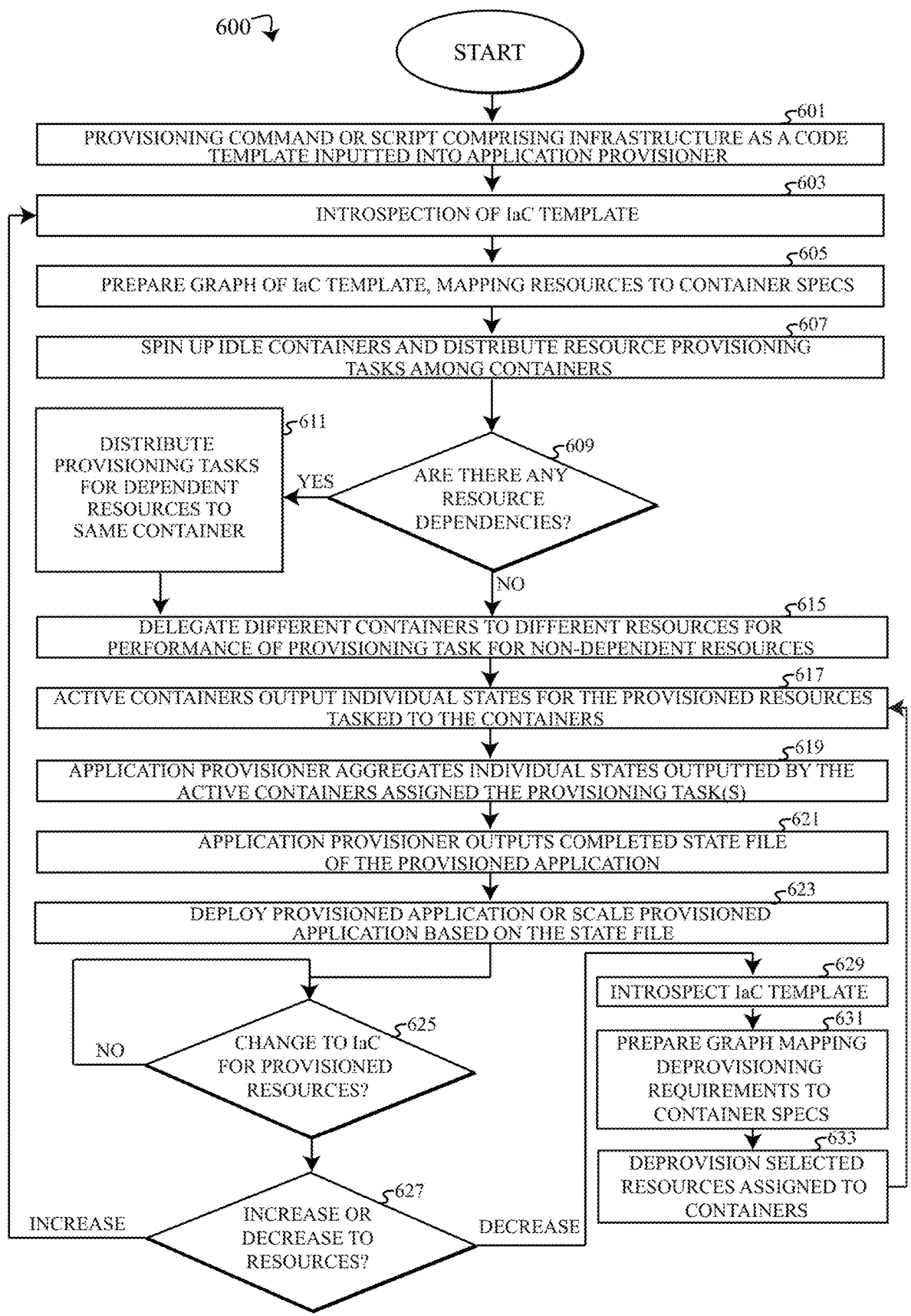
FIG. 6 depicts an embodiment of an algorithm implementing a computerized method for provisioning an application using containerized parallel provisioning in accordance with the present disclosure.

Method for Using Infrastructure as Code to Perform Parallel Provisioning of Resources The drawing of FIG. 6 represents an embodiment of an algorithm 600 performing a computer-implemented method provisioning resources for an application using containers 210 to orchestrate parallel provisioning of the application being deployed. The algorithm 600, as shown and described by FIG. 6, may use one or more computer systems, defined generically by data processing system 100 of FIG. 1, and more specifically by the embodiments of specialized data processing systems depicted in FIGS. 2-5b and as described herein. A person skilled in the art should recognize that the steps of the algorithm 600 described in FIG. 6 may be performed in a different order than presented. The algorithm 600 may not necessarily require all the steps described herein to be performed. Rather, some embodiments of algorithm 600 may alter the methods by performing a subset of steps using one or more of the steps discussed below.

Embodiments of the algorithm 600 may begin at step 601. In step 601, a provisioning command or script comprising describing an IaC template 219 that can be pulled by the application provisioner 217 is inputted into the application provisioner 217. For example, using a REST API or inputting a command through a CLI. The IaC template 219 may define provisioning requirements and describe resources 501 to be provisioned for deploying a provisioned application 225. The application provisioner 217 receiving the IaC template 219 may, in step 603 perform introspection of the IaC template 219. During introspection of the IaC template 219, the application provisioner 217 reads the IaC template 219 and determines the number of containers 210 to spin up in order to perform the process of provisioning the resources 501. Moreover, the application provisioner 217 considers the specifications of idle containers 210 available in the container cluster 209 for provisioning the resources 501. For example, taking into consideration processor 103, memory 105, persistent storage 106 allocated to the containers 210 for the resources 501 requested to be provisioned and tuning the container 210 specifications up or down in order to meet the demands of the provisioning request. In some embodiments, application provisioner 217 may query available specification data, such as community-driven specifications, machine learning data or knowledge bases, to decide on container 210 specifications that would be the most appropriate for provisioning the requested resources 501 in accordance with the IaC template 219.

Furthermore, during introspection of the IaC template 219 in step 605, the application provisioner 217 may determine whether one or more resources 501 are dependent on another resource 501. The application provisioner 217 may consider the presence of dependent resources, because in order to provision a dependent resource, the parent resource from which the dependent resource depends, may need to be provisioned first, followed by the provisioning of the dependent resource. In order to avoid errors during the provisioning process, dependent resources may be delegated for provisioning to the same container 210 as the resource 501 from which the dependent resource depends upon. Ensuring that the resources 501 are not provisioned out of order, which could occur if two separate containers 210 separately provision the dependent resource independently of a parent resource.

In step 605, the application provisioner 217 can prepare a graph based on the introspection of the IaC template 219 performed in step 603. Embodiments of the graph may contain information describing the resources 501 requested to be provisioned. The application provisioner 217 may perform an initial mapping of the resources 501 to the container 210 specifications determined to be appropriate for performing the provisioning task for the resource 501. Moreover, embodiments of the graph may map both dependent and non-dependent resources 501. For dependent resources (i.e. one or more resources 501 that depend on another resource 501), the application provisioner 217 may map the dependent resources 501 to the same container 210, whereas resources 501[1] that are not dependent upon other resources are mapped to separate containers 210 that provision resources 501 parallel to one another.

[1] 501

In step 607 of algorithm 600, the application provisioner 217 may determine which containers 210 are idle within the container cluster 209. The application provisioner 217 may select the idle containers 210 and spin up idle containers 210 of the container cluster 209 with specification needed for the resources mapped to the containers 210 in the graph prepared in step 605. Embodiments of the application provisioner 217 may distribute resource provisioning tasks to the selected containers 210 for the individual resources 501 being provisioned. In step 609 of algorithm 600, a determination whether there are any resource dependencies is considered while distributing resource provisioning tasks to the containers 210. If resource dependencies are present, the algorithm 600 may proceed to step 611, wherein the application provisioner 217 distributes provisioning tasks for dependent resources to the same container 210. Conversely, if in step 609, there are no dependent resources, the algorithm 600 may proceed directly to step 615.

In step 615 of algorithm 600, the application provisioner 217 delegates non-dependent resources to different containers 210, wherein each container 210 is tasked with provisioning the non-dependent resources. In the exemplary embodiments, the non-dependent resources being provisioned are provisioned by separate containers 210, performing the provisioning tasks in parallel to one another. In step 617, the active containers 210 assigned a provisioning task, execute the provisioning task assigned to the container 210 and each container 210 output individual states describing the provisioned resource to the application provisioner 217.

In step 619 of algorithm 600, the application provisioner aggregates the individual states outputted by the active containers provisioning the resources 501. The application provisioner 217 combines the individual states into a completed state file 221 describing the provisioned application 225 and any resource dependencies. In step 621, the application provisioner 217 outputs the completed state file 221 and in step 623, the provisioned application 225 is deployed or scaled based on the provisioned resources 501 of the completed state file 221 mapping the provisioned resources to one or more real resources of the operating system hardware 203 of the host system 201 deploying the provisioned application 225. Accordingly, one or more client systems 227 may access to the provisioned application 225 over network 250 via the application interface 229, upon deployment of the provisioned application 225.

In step 625 of algorithm 600, a determination may be made whether a change to the configuration of the provisioned application as a function of a change to an IaC template 219 or receipt of a command pulling a new IaC template 219 has been received, indicating a change to the amount of infrastructure being needed to scale up or scale down to meet the demands of a service provider or customers accessing the provisioned application 225. For example, via input of a new REST API script or CLI command. If there has not been a change to the IaC template 219, or a new IaC template 219 has not been pulled by the application provisioner 217, the provisioned application 225 may remain deployed with the currently provisioned resources 501, until the application provisioner 217 is instructed to scale up or scale down resources 501. Likewise, if in step 625 a determination is made that there has been a change to the configuration of the provisioned application as evidenced by a change to the IaC template 219 of step 601 or a new IaC template 219 is inputted into the application provisioner 217, the algorithm may proceed to step 627.

In step 627, the algorithm 600 may determine whether the change to the IaC template 219 is an increase in resources 501 needing to be provisioned, or whether the IaC template 219 is requesting one or more resources of the provisioned application 225 to be deprovisioned. If the IaC template 219 is requesting an increase to the provisioned resources 501 being provided to the provisioned application 225, the algorithm 600 may proceed back to step 603, wherein the IaC template 219 can be introspected and the application provisioner 217 can spin up additional containers 210 to provision the additional resources being requested or tune up existing containers with specifications needed to handle the new configuration defined by the IaC template. Conversely, if in step 627, the IaC template 219 is requesting one or more resources 501 currently provisioned by containers 210 to be deprovisioned, the algorithm 600 may proceed to step 629 and introspect the IaC template 219 defining the resources being deprovisioned.

In step 631 of algorithm 600, the application provisioner 217 can prepare a graph mapping out the deprovisioning requirements of the IaC template 219 to the container specification and determine the resources 501 associated to the containers that will be deprovisioned by the application provisioner 217. In step 633, application provisioner 217 can delegate deprovisioning tasks to the containers 210 responsible for previously provisioning the resources 501 that are now being deprovisioned. Embodiments of container 210 can deprovision the resource 501 according to the updated configuration and state information stored by the state file 221 to ensure that dependent resources are deprovisioned in the proper order. The algorithm 600 may return to step 617, and output an updated individual state confirming the resource has been deprovisioned. Application provisioner 217 can aggregate the updated individual state provided by the container 210 and modify the state file 221 to accurately reflect a completed state of the provisioned application 225 which has removed one or more resources 501 that were deprovisioned by the containers 210 and update the resource mappings between the provisioned resources and the host system hardware 203.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    performing, by an application provisioner, introspection of a template comprising infrastructure as code ("IaC");
    preparing, by the application provisioner, a graph describing the template based on the introspection of the template and mapping resources requested by the template to specifications of one of more containers configured to provision the resources mapped to the template;
    assigning, by the application provisioner, provisioning tasks to a cluster of containers comprising at least two containers, wherein a first container receives a first provisioning task dedicated to provisioning a first resource and a second container receives a second provisioning task dedicated to provisioning a second resource;
    receiving, by the application provisioner, a first output from the first container comprising a first state information describing deployment of the first resource provisioned by the first container;
    receiving, by the application provisioner, a second output from the second container comprising a second state information describing deployment of the second resource provisioned by the second container;
    combining, by the application provisioner, state information from the cluster of containers, including the first state information outputted by the first container, and the second state information outputted by the second container, into a state file aggregating the state information from the at least two of a plurality of containers assigned the provisioning tasks into a complete state of a provisioned application; and
    deploying, by the application provisioner, the provisioned application.

2. The computer-implemented method of claim 1, wherein the introspection of the template determines whether one or more resources are dependent upon a separate resource.

3. The computer-implemented method of claim 2, wherein non-dependent resources are provisioned by separate containers and resources dependent upon one another are provisioned by a single container.

4. The computer-implemented of claim 2, comprising:
    determining, by the application provisioner, that provisioning a third resource is dependent upon provisioning the second resource;
    assigning, by the application provisioner, a third provisioning task to the second container, wherein the third provisioning task is dedicated to provisioning the third resource; and
    receiving, by the application provisioner, a third output from the second container comprising a third state information describing deployment of the third resource provisioned by the second container.

5. The computer-implemented method of claim 1, wherein the introspection further comprises determining a number of new containers to spin up to meet requirements of the provisioning tasks, in order to assign one container to each resource being provisioned.

6. The computer-implemented method of claim 3, wherein the introspection predicts container specification required by the single container to provision the resources dependent upon one another.

7. The computer-implemented method of claim 1, further comprising:
    receiving, by the application provisioner, a second template comprising a script for deprovisioning one or more provisioned resources;
    performing, by the application provisioner, introspection of the second template;
    preparing, by the application provisioner, a second graph mapping provisioned resources to one or more containers responsible for provisioning the provisioned resources; and
    assigning, by the application provisioner, deprovisioning tasks to selected containers responsible for provisioning the provisioned resources being deprovisioned.

8. A computer system comprising:
    at least one processor; and
    a computer-readable storage media coupled to the at least one processor, wherein the computer-readable storage media contains program instructions executing a computer-implemented method comprising:
        performing, by an application provisioner, introspection of a template comprising infrastructure as code ("IaC");
        preparing, by the application provisioner, a graph describing the template based on the introspection of the template and mapping resources requested by the template to specifications of one of more containers configured to provision the resources mapped to the template;
        assigning, by the application provisioner, provisioning tasks to a cluster of containers comprising at least two containers, wherein a first container receives a first provisioning task dedicated to provisioning a first resource and a second container receives a second provisioning task dedicated to provisioning a second resource;

receiving, by the application provisioner, a first output from the first container comprising a first state information describing deployment of the first resource provisioned by the first container;

receiving, by the application provisioner, a second output from the second container comprising a second state information describing deployment of the second resource provisioned by the second container;

combining, by the application provisioner, state information from the cluster of containers, including the first state information outputted by the first container, and the second state information outputted by the second container, into a state file aggregating the state information from the at least two of a plurality of containers assigned the provisioning tasks into a complete state of a provisioned application; and deploying, by the application provisioner, the provisioned application.

9. The computer system of claim 8, wherein the introspection of the template determines whether one or more resources are dependent upon a separate resource.

10. The computer system of claim 9, wherein non-dependent resources are provisioned by separate containers and resources dependent upon one another are provisioned by a single container.

11. The computer system of claim 9, further comprising:
determining, by the application provisioner, that provisioning a third resource is dependent upon provisioning the second resource;
assigning, by the application provisioner, a third provisioning task to the second container, wherein the third provisioning task is dedicated to provisioning the third resource; and
receiving, by the application provisioner, a third output from the second container comprising a third state information describing deployment of the third resource provisioned by the second container.

12. The computer system of claim 8, wherein, the introspection further comprises a determining a number of new containers to spin up to meet requirements of the provisioning tasks, in order to assign one container to each resource being provisioned.

13. The computer system of claim 10, wherein the introspection predicts container specification required by the single container to provision the resources dependent upon one another.

14. The computer system of claim 8, further comprising:
receiving, by the application provisioner, a second template comprising a script for deprovisioning one or more provisioned resources;
performing, by the application provisioner, introspection of the second template;
preparing, by the application provisioner, a second graph mapping provisioned resources to one or more containers responsible for provisioning the provisioned resources; and
assigning, by the application provisioner, deprovisioning tasks to selected containers responsible for provisioning the provisioned resources being deprovisioned.

15. A computer program product comprising:
one or more computer-readable storage media having computer-readable program instructions stored on the one or more computer-readable storage media said program instructions executes a computer-implemented method comprising:
performing, by an application provisioner, introspection of a template comprising infrastructure as code ("IaC");
preparing, by the application provisioner, a graph describing the template based on the introspection of the template and mapping resources requested by the template to specifications of one of more containers configured to provision the resources mapped to the template;
assigning, by the application provisioner, provisioning tasks to a cluster of containers comprising at least two containers, wherein a first container receives a first provisioning task dedicated to provisioning a first resource and a second container receives a second provisioning task dedicated to provisioning a second resource;
receiving, by the application provisioner, a first output from the first container comprising a first state information describing deployment of the first resource provisioned by the first container;
receiving, by the application provisioner, a second output from the second container comprising a second state information describing deployment of the second resource provisioned by the second container;
combining, by the application provisioner, state information from the cluster of containers, including the first state information outputted by the first container, and the second state information outputted by the second container, into a state file aggregating the state information from the at least two of a plurality of containers assigned the provisioning tasks into a complete state of a provisioned application; and
deploying, by the application provisioner, the provisioned application.

16. The computer program product of claim 15, wherein the introspection of the template determines whether one or more resources are dependent upon a separate resource.

17. The computer program product of claim 16, wherein non-dependent resources are provisioned by separate containers and resources dependent upon one another are provisioned by a single container.

18. The computer program product of claim 16, comprising:
determining, by the application provisioner, that provisioning a third resource is dependent upon provisioning the second resource;
assigning, by the application provisioner, a third provisioning task to the second container, wherein the third provisioning task is dedicated to provisioning the third resource; and receiving, by the application provisioner, a third output from the second container comprising a third state information describing deployment of the third resource provisioned by the second container.

19. The computer program product of claim 17, wherein the introspection further comprises:
determining a number of new containers to spin up to meet requirements of the provisioning tasks, in order to assign one container to each resource being provisioned; and
predicting container specification required by the single container to provision the resources dependent upon one another.

20. The computer program product of claim 15, further comprising:

receiving, by the application provisioner, a second template comprising a script for deprovisioning one or more provisioned resources;
performing, by the application provisioner, introspection of the second template;
preparing, by the application provisioner, a second graph mapping provisioned resources to one or more containers responsible for provisioning the provisioned resources; and
assigning, by the application provisioner, deprovisioning tasks to selected containers responsible for provisioning the provisioned resources being deprovisioned.

* * * * *